United States Patent [19]

Ito et al.

[11] Patent Number: 5,450,457
[45] Date of Patent: Sep. 12, 1995

[54] SAMPLING PHASE EXTRACTING CIRCUIT

[75] Inventors: Tomokazu Ito; Akihiko Sugiyama, both of Tokyo, Japan

[73] Assignee: NEC Corporation, Tokyo, Japan

[21] Appl. No.: 119,396

[22] Filed: Sep. 13, 1993

[30] Foreign Application Priority Data

Sep. 11, 1992 [JP] Japan .................................. 4-242466

[51] Int. Cl.$^6$ ............................................ H04L 7/00
[52] U.S. Cl. .................................... 375/355; 375/371
[58] Field of Search ................. 370/100.1, 105.3, 108; 375/355, 371, 373, 374, 375, 376, 362; 327/141, 144

[56] References Cited

U.S. PATENT DOCUMENTS 5,247,544   9/1993   LaRosa et al. ....................... 375/106

*Primary Examiner*—Stephen Chin
*Assistant Examiner*—Hai H. Phan

*Attorney, Agent, or Firm*—Sughrue, Mion, Zinn, Macpeak & Seas

[57] ABSTRACT

Correlation signals between the residual intersymbol interference, which is the difference signal between the input and output signals of the decision circuit, and the result of decision is cumulatively added by an integrator. The result of the integration is sampled by a sampler at every NT. A phase control circuit, whose input is the difference signal between the sampled signal and the previous integration result, adaptively controls the phase renewal quantity during training in accordance with the codes of the aforementioned two input signals. The above-described configuration makes it possible to reduce the convergence time of the decision feedback equalizer to about ½ of that taken by the conventional process, and manifests a significant effect in satisfying the requirement for the warm start in training, prescribed for the set-up mode of the system.

2 Claims, 5 Drawing Sheets

SAMPLING PHASE EXTRACTING CIRCUIT

BACKGROUND OF THE INVENTION

The present invention relates to a digital subscriber loop system, and more particularly to a sampling phase extracting circuit for use in a digital subscriber loop system.

A digital subscriber loop system for bidirectional communication according to the prior art is provided with an echo canceller for eliminating echo signals from the transmitter on the terminal and with an equalizer for equalizing intersymbol interference.

A conventional sampling phase extracting circuit includes a multiplier for generating a correlation signal between a residual intersymbol interference (which is the difference signal between the input signal and the output signal of the decision circuit) and the result of decision (which is the output signal of the decision circuit). The correlation signal is turned into an integrated signal resulting from N cumulative additions by an integrator. The integrated signal is sampled by a sampler at every NT to produce a sampled signal which is inputted to a phase control circuit. The phase control circuit digitally controls the phase of a baud rate clock (80 kHz), which is the operational clock for the system, for each period (about 65 nsec) of an external oscillator (15.36 MHz), which is the master clock of the system. However, the conventional phase extracting citcuit has a problem in that since it digitally controls the phase in the clock width (65 nsec) units of the master clock (15.36 MHz) in sampling phase synchronization, it invites prolongation of the phase synchronization time. This prolongation of the phase synchronization time is due to the mutual interference witnessed between the converging characteristic of the decision feedback equalizer and the synchronizing characteristic of the phase control circuit. Thus, unless the decision feedback equalizer converges, the phase control circuit will not operate normally, and the decision feedback equalizer, in order to converge, should operate within a certain limited range of phase.

SUMMARY OF THE INVENTION

It is, therefore, an object of the present invention to provide a sampling phase extracting circuit capable of increasing the speed of the convergence of the sampling phase with a view to realizing fast convergence of the decision feedback equalizer.

An aspect of the present invention comprises a receiving circuit for receiving a coded signal by a prescribed coding formula. A decision circuit discriminates the code level of the received signal. An equalizer removes intersymbol interference of signals sampled from the received signal on a code-by-code basis to detect the sampling phase of the received signal.

The present sampling phase extracting circuit further includes a first integrator for detecting and accumulating the intersymbol interference components of the codes discriminated by the decision circuit. A sampling circuit samples the accumulated output from the integrator. A phase control circuit generates a sampling signal by varying the sampling phase for the received signal according to a first sampled signal, which is an output of the sampling circuit, and a second sampled signal of a prescribed length of time before that.

The phase control circuit makes the variance of the sampling phase, when the amplitude of the first sampled signal is greater than that of the second sampled signal, greater than the variance of the sampling phase when the amplitude of the first sampled signal is smaller than that of the second sampled signal.

In the above-described configuration of the present invention, the integrator comprises a differential circuit for generating a residual intersymbol interference, which is a difference signal between the input signal and the output signal of the decision circuit, a correlation circuit for generating a correlation signal between the difference signal and the output signal of the decision circuit; and an integrator for integrating the correlation signal for every one of the sampling phases.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENT

To better understand the present invention, a reference will be made to a conventional digital subscriber loop system, shown in FIG. 1.

Figure 1:
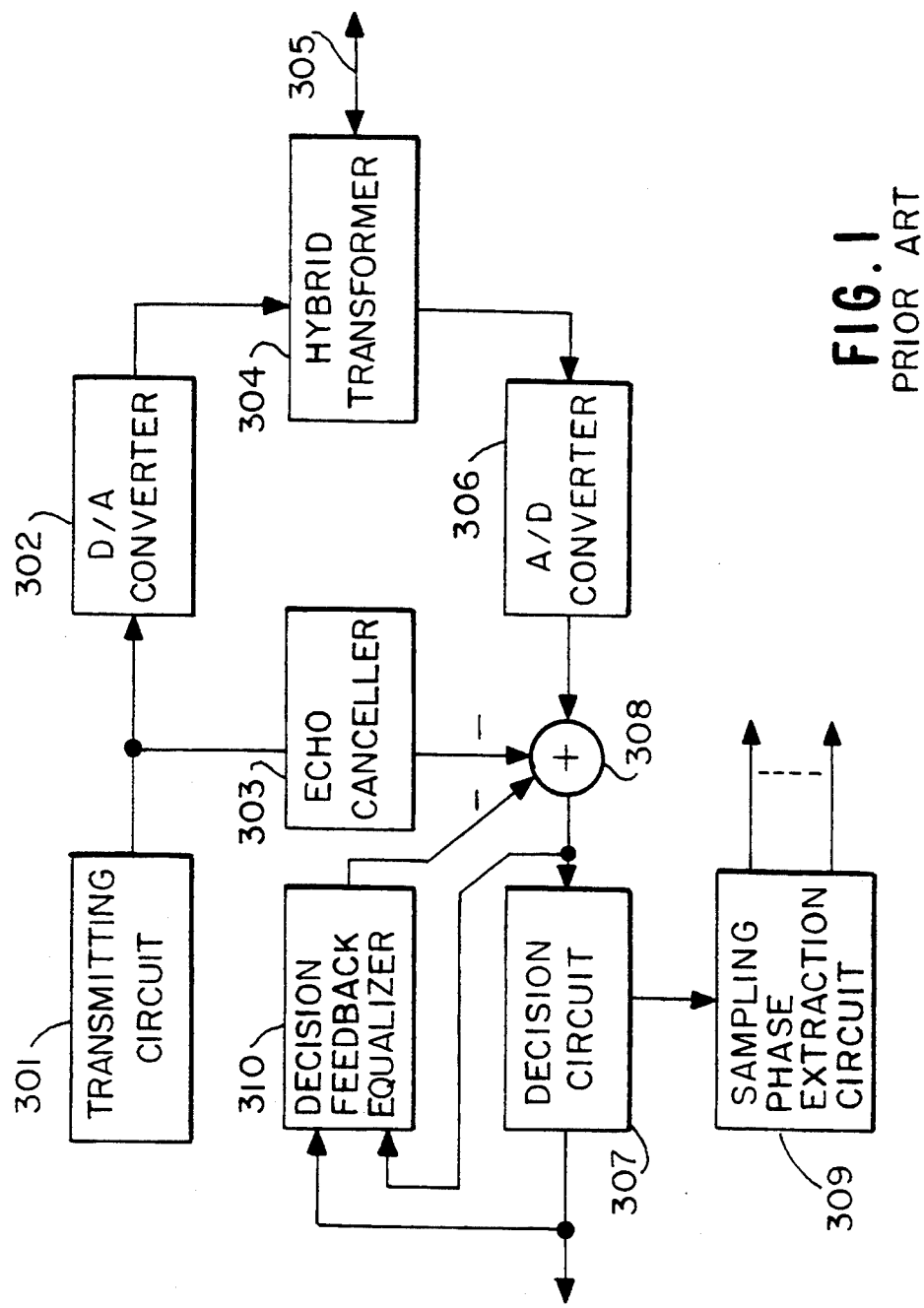
FIG. 1 shows a block diagram illustrating the configuration of a digital subscriber loop system according to the prior art.

As shown in FIG. 1, the subscriber loop system comprises a transmitting circuit 301. A digital transmit signal from the transmitting circuit 301 is converted into an analog signal by a D/A converter 302, and sent out to a subscriber line 305. A received signal from the subscriber line 305 is supplied via a hybrid transformer 304 to an A/D converter 306, in which it is converted into a digital signal. Since the digital signal contains an echo component, which is a leak signal from the transmitting circuit 301, and components of the distortion of the received signal and intersymbol interference, they are removed by an echo canceller 303 and with a decision feedback equalizer 310 including an FIR filter. Thus an adder 308 outputs a signal free of echo and intersymbol interference by performing addition (actually subtraction) between the output of the A/D converter 306 and these outputs of the canceller and the equalizer, and the decision circuit 307 produces a decision value. Incidentally, the sampling phase extracting circuit 309 detects the sampling phase by utilizing the input and output signals of the decision circuit 307.

As analog signals to be transmitted over the subscriber line 305, four-value signals (signals of the 2BIQ code) for ISDN's U interface are often used. These signals are 80K baud signals in which binary two bits 10, 11, 01 and 00 of 160 kb/s correspond to the +3, +1, −1 and −3 levels, respectively. In this case, the decision circuit 307 outputs decision values +3, +1, −1 and −3 at a baud rate period of 1/80 kHz.

Figure 2:
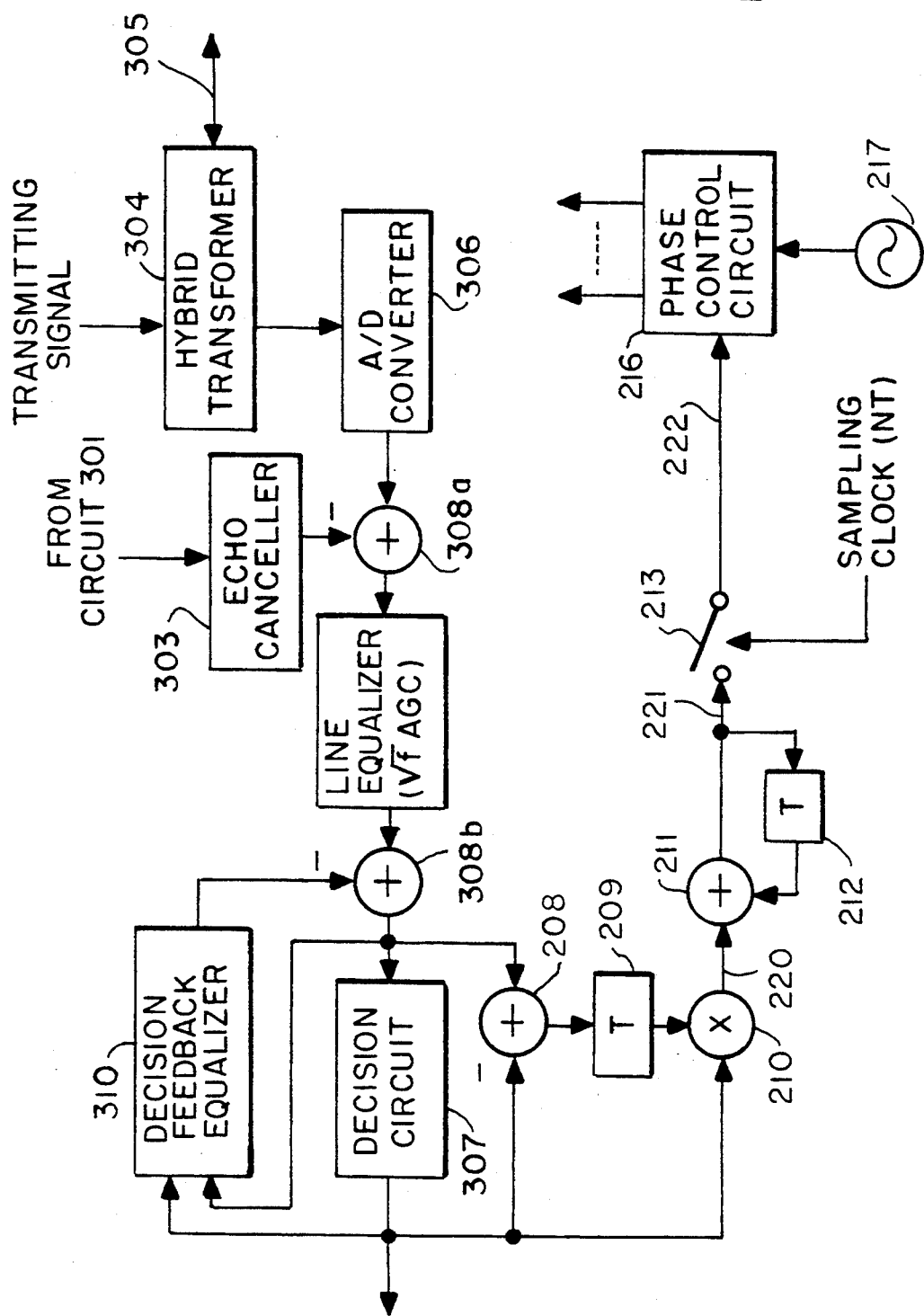
FIG. 2 shows a more specific block diagram of the system shown in FIG. 1.

FIG. 2 is a block diagram illustrating in detail a part of the system of FIG. 1. In the figure, a $\sqrt{f}$ line equalizer 300 for equalizing the line loss is newly added. The sampling phase extracting circuit 309 comprises a multiplier 210 for generating a correlation signal 220 between a residual intersymbol interference, which is the difference signal between the input signal and the output signal of the decision circuit. The correlation signal 220 is turned into a signal 221 resulting from N cumulative additions by an integrator consisting of an adder 211 and a delay 212 having a baud rate period of T=1/80 kHz. This processing of N cumulative additions averages the correlation signal 220. The integrated signal 221 is sampled by the sampler 213 at every NT by a clock signal having NT repetition frequency which is derived from an oscillator 217. Here the internal result of the delay 212 is reset (initialized) at every NT. The sampled signal 222 is inputted to the phase control circuit 216. The phase control circuit 216 digitally controls the phase of a baud rate clock (80 kHz), which is the operational clock for the system, for each period (about 65 nsec) of the external oscillator (15.36 MHz), which is the master clock of the system. Here N (the number of integrations) is set at 64, taking account of the compliance of phase synchronization and the quantity of jitter which occurs, among other factors.

Figure 3A:
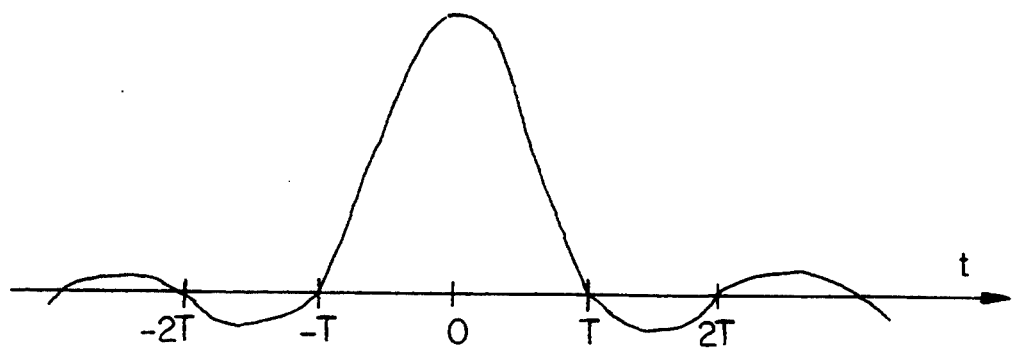
FIGS. 3A and 3B show a waveform diagram for explaining sampling phases.
Figure 3B:
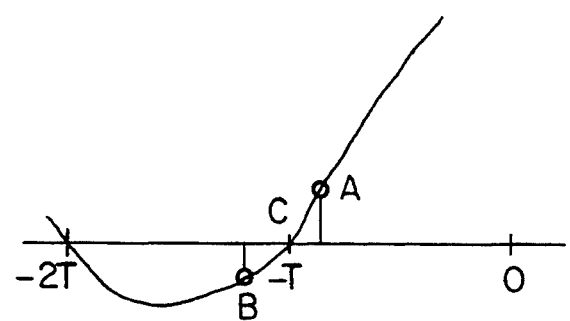

FIG. 3 (a) is a waveform diagram of an ideal solitary wave equalized by each equalizer in FIG. 2 (and FIG. 1). The phase control circuit 216 will be at its optimum if it is so adjusted that the phase of the sampling signal (sampling phase in each equalizer), which is its output, comes to the position of −2T, −T, 0, T or 2T in FIG. 3 (a). However, if the phase of the sampling signal comes to the position of point A in FIG. 3 (b), i.e. if the sampling phase is advanced, the signal 222 will be positive, while the sampling phase is delayed as at point B in FIG. 3 (b), the signal 222 will be negative. Therefore, the phase control circuit 216 is so adjusted as to bring the sampling phase to point C according to whether the signal 222 is positive or negative.

The algorithm of phase control is shown below, with the phase renewal quantity at a time being represented by $\Delta\tau$.

1) When the signal 222≧0, $\Delta\tau = -T/192$ (the phase is delayed by 65 nsec).

2) When the signal 222<0, $\Delta\tau = T/192$ (the phase is advanced by 65 nsec).

Thus the phase renewal quantity at the time of sampling phase synchronization is made equal to one phase width (65 nsec) of the system clock (15.36 MHz), which is 192 times the baud rate clock (80 kHz), and is controlled (either advanced or delayed) according to the sign of the signal 222. It is made possible to extract the optimal sampling phase from received data by performing the above-described action during training and during normal operation.

The training period is provided as the set-up mode for the system before the total duplex communication state is achieved, and it can be classified into two modes including a cold start, which is a start-up from the fully reset state of the system, and a warm start, which is a start-up from a state in which the subscriber line is held as it is. The training durations for these two modes are separately prescribed; according to the ANSI (American National Standards Institute) standards, which are the North American standards, the cold start is prescribed to be within 15 sec and, the warm start, within 300 msec.

During the training period, the convergence of the echo canceller 303, that of the decision feedback equalizer 310, and the synchronization of the system with the sampling phase by the sampling phase extracting circuit 309 are carried out. Especially, the convergence of the decision feedback equalizer 310 and the sampling phase synchronization interfere with each other, and invites prolongation of the training period, and this poses a problem particularly when the training time requirement in the warm start mode is to be satisfied.

The present invention is intended to increase the speed of the convergence of the sampling phase with a view to realizing fast convergence of this decision feedback equalizer.

Figure 4:
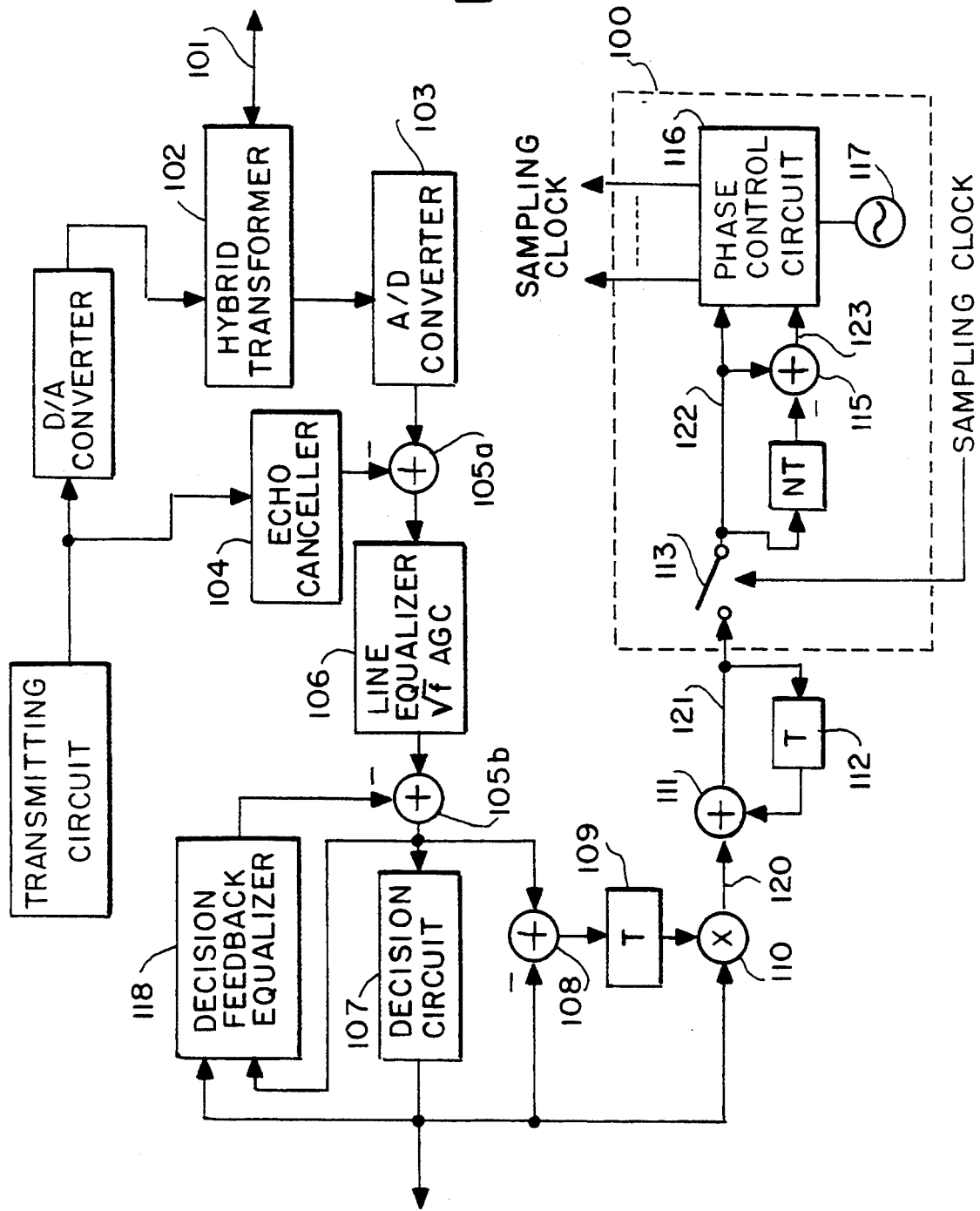
FIG. 4 shows a block diagram of one embodiment of the present invention.

FIG. 4 is a block diagram illustrating an embodiment of the invention. In the figure, the blocks except a sampling phase control circuit 100 are the same as those of the circuit of FIG. 2. Thus in FIGS. 4 and 2, a subscriber line 101 is the same as 305; a hybrid transformer 102, as 304; an analog-to-digital converter 103, as 306; an echo canceller 104, as 303; adders 105a and 105b, as 308a and 308b; a line equalizer 106, as 300; a discriminative decider 107, as 307; an adder 108, as 208; a delayer 109, as 209; a multiplier 110, as 210; an adder 111, as 211; a delayer 112, as 212; a decision feedback type equalizer 118, as 310; and transmission codes are the same.

Here the adder 108, delay 109, multiplier 110, adder 111 and delay 112 constitute a first circuit for detecting and accumulating (integrating) the intersymbol interference components of codes discriminated by the decision circuit 107. The sampling phase control circuit 100 includes a sampling circuit and a phase control circuit according to the present invention.

The operations will be described below. As the operations from the hybrid transformer 102 to the decision circuit 107 are the same as the prior art illustrated in FIGS. 1 and 2, their description will be dispensed with.

As in the conventional process, the residual intersymbol interference, which is the difference signal of the input and output signals of the decision circuit 107, is delayed by one time slot equivalent (T − 12.5 μsec) of the baud rate clock (80 kHz) by the delay 109, and the correlation with the output signal of the decision circuit 107 is obtained by the multiplier 110. The correlation signal 120 are cumulatively added by an integrator consisting of the adder 111 and the delay 112. The integrated signal 121 is supplied to the sampling phase control circuit 100, and sampled by a sampler 113 at every NT. Simultaneously with the sampling at every NT, the integrated signal is also reset in the delay 112. Here N represents the number of integrations, and is set at 64 as in the conventional process. A sampled signal 122 is inputted to a time NT delay 114. An adder 115 outputs a difference signal 123 between the sampled signal 122 and a signal resulting from its delaying by time NT by the delay 114. The signals 122 and 123 are inputted to a phase control circuit 116, and the phase control circuit 116 controls the phase of the baud rate clock on the basis of a 15.36 MHz master clock.

Thus, while the phase of the baud rate clock is controlled only with the sign of the signal 122 by the conventional process, the present invention performs phase control by using the signal 122 and the signal 123 of difference from the previous phase control signal (time NT before).

Here, when the sampling phase substantially deviates from the optimal phase, the amplitude of the signal 122 becomes greater than its value of time NT before. In this case, the signal 122≧0 and the signal 123≧0, or the signal 122<0 and the signal 123<0. On the other hand, when the deviation of the sampling phase diminishes, the signal 122≧0 and the signal 123<0, or the signal 122<0 and the signal 123≧0. Therefore, the phase control algorithm of this embodiment is as follows, where the phase control quantity at a time is represented by $\Delta\tau$.

When signal 122≧0 and signal 123≧0, 
$\Delta\tau = -2T/192$ (1)

When signal 122≧0 and signal 123<0, $\Delta\tau = -T/192$ (2)

When signal 122<0 and signal 123≧0, $\Delta\tau = T/192$ (3)

When signal 122<0 and signal 123<0, $\Delta\tau = 2T/192$ (4)

Here T represents the baud rate period (1/80 kHz), which is 192 times as long as the period of the system clock (15.36 MHz). The aforementioned algorithm makes it possible to accelerate synchronization with the optimal phase and the convergence of the decision feedback equalizer by adaptively controlling $\Delta\tau$ with the signals 122 and 123.

Figure 5:
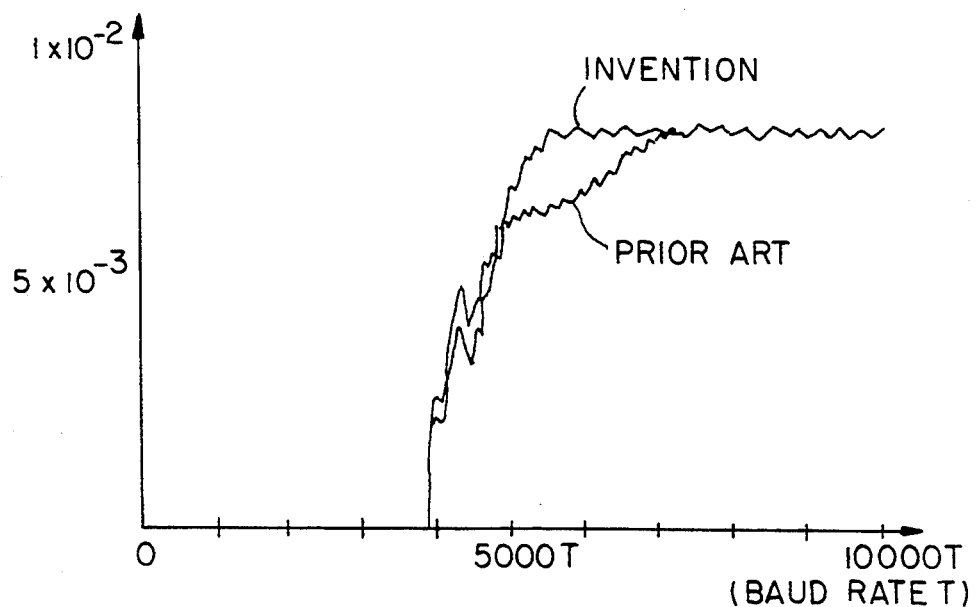
FIG. 5 shows a characteristics diagram showing the result of simulation of the total sums of the squares of the coefficients of the 22-tap FIR filter.

FIG. 5 shows the result of simulation of the converging characteristic of the decision feedback equalizer during training. A 22-tap FIR filter is used as the decision feedback equalizer, and in FIG. 5, the horizontal axis represents the time, and the vertical axis, the total sum of the squares of the coefficients of the 22 taps. This figure shows the growth process of the coefficients of the decision feedback equalizer; the square rate of the total sum of the squares of the coefficients takes on a flat characteristic when the decision feedback equalizer converges. From the figure, it is seen that the decision feedback equalizer used in the conventional system takes about 3,200 T (40 msec) to converge.

On the other hand, the convergence time of the decision feedback equalizer in the invention is reduced to 1600 T (20 msec), which is about ½ of that taken by the conventional process.

Figure 6:
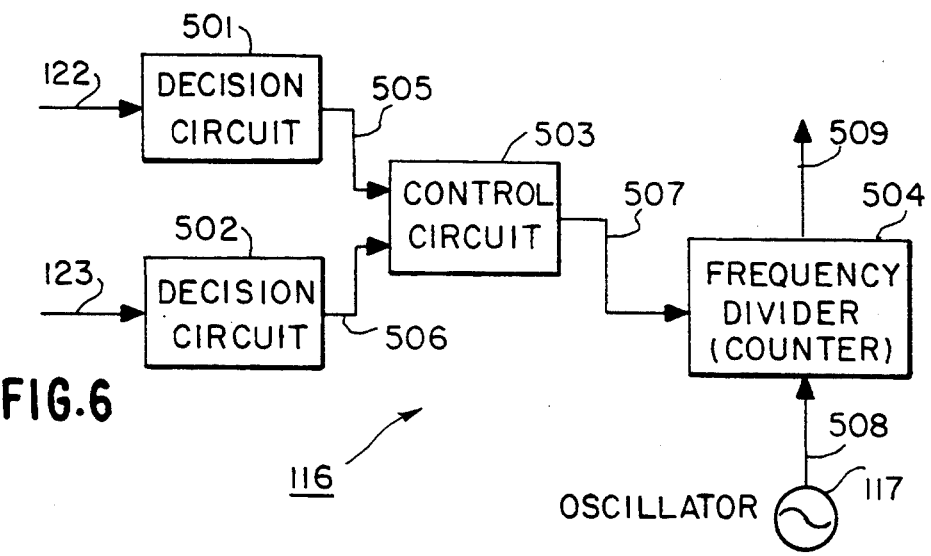
FIG. 6 shows a block diagram of the phase control circuit.

FIG. 6 is a detailed block diagram of the phase control circuit 116 for the subscriber loop transmission system shown in FIG. 4.

One-bit decision circuits 501 and 502 respectively decide the signs of the phase control signals 122 and 123, and generate output signals 505 and 506 representing those signs. Zero level comparators, for instance, are suitable as the one-bit decision circuits. A frequency divider control circuit 503 generates a control signal 507 in accordance with the output signals 505 and 506 to perform control over a frequency divider (counter) 504. Its phase control algorithm is as shown by the above-cited formulas (1) through (4).

Figure 7:
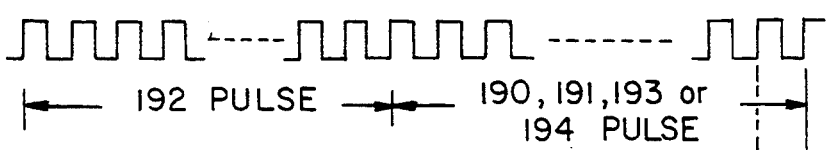
FIG. 7 shows a time chart for the block diagram of FIG. 6.

FIG. 7 is a timing chart showing the 15.36 MHz clock signal from a quartz oscillator 117 and the frequency division output signal of the frequency divider 504. The frequency divider 504 generates frequency division pulses by counting 192 clock signals of 15.36 MHz, and forms sampling clock signals 509 of 80 kHz in baud rate. While the counter divides the frequency by 192 during its steady operation, it counts 190, 191, 193 or 194 according to the signal 507 when the signal 507 is generated, i.e. when the decision feedback equalizer 118 does not converge and the sampling phase is deviating from its appropriate value. As a result, the clock period of the clock signals 509 varies at 2T/192, T/192, −T/192 and −2T/192 to correct the sampling phase.

As hitherto described, the present invention can accelerate the convergence of the decision feedback equalizer and the phase synchronization of the baud rate clock by adaptively controlling, when phase-synchronizing the baud rate clock during training, the phase control quantity in the converging process of the decision feedback equalizer by using the quantity of residual intersymbol interference.

What is claimed is:

1. A sampling phase extracting circuit for determining a sampling phase of a received signal, for use in a transmission system including a discriminating circuit for receiving from a transmission path said received signal and discriminating said received signal, and an equalizer for removing intersymbol interference from said received signal, said sampling phase extracting circuit comprising:

a sampler for sampling a signal resulting from integration of a correlation signal between a residual intersymbol interference, which is a difference signal between an input and an output signal of said discriminating circuit, and the output signal of said discriminating circuit;

a delay having as its input a first signal sampled by said sampler;

an adder for subtracting the output signal of said delay from said first signal to produce a difference signal; and a phase control circuit for varying the sampling phase according to said first signal and the difference signal, said phase control circuit controlling said sampling phase to make the variance of said sampling phase, when one of both and neither of said first signal and said difference signal have negative values, greater than when exactly one of said first signal and said difference signal has a negative value.

2. A sampling phase extracting circuit, as claimed in claim 1, wherein said phase control circuit includes decision means for discriminating the polarities of said adder first signal and the output of said;

means for generating a high speed clock signal;

means for dividing a frequency of said clock signal; and means for making the frequency division ratio of said clock signal variable according to the output of said decision means.

* * * * *

UNITED STATES PATENT AND TRADEMARK OFFICE
CERTIFICATE OF CORRECTION

PATENT NO. : 5,450,457
DATED : September 12, 1995
INVENTOR(S) : Tomokazu Ito and Akihiko Sugiyama It is certified that error appears in the above-indentified patent and that said Letters Patent is hereby corrected as shown below:

Col. 6, line 53, delete "adder First signed and the output of said" and insert --first signal and the output of paid adder--.

Signed and Sealed this

Thirtieth Day of April, 1996

*Attest:*

BRUCE LEHMAN

*Attesting Officer*       *Commissioner of Patents and Trademarks*